United States Patent
Hayashi et al.

(10) Patent No.: US 6,396,644 B2
(45) Date of Patent: May 28, 2002

(54) ZOOM LENS BARREL

(75) Inventors: Shigeo Hayashi, Okaya; Tatsuo Takanashi, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/739,465

(22) Filed: Dec. 18, 2000

(30) Foreign Application Priority Data

Dec. 24, 1999 (JP) ............................................ 11-368192

(51) Int. Cl.[7] .............................................. G02B 15/14
(52) U.S. Cl. ........................ 359/699; 359/700; 359/701
(58) Field of Search ................................. 359/822, 823, 359/826, 695, 696, 698, 699, 700, 701, 702, 703, 704, 705; 396/75, 85, 348, 349

(56) References Cited

U.S. PATENT DOCUMENTS 6,035,136 A * 3/2000 Hyashi et al. ................. 396/72
6,115,191 A * 9/2000 Ito et al. ...................... 359/699

FOREIGN PATENT DOCUMENTS

JP 7-191249 7/1995

* cited by examiner

Primary Examiner—Loha Ben
Assistant Examiner—Saeed Seyrafi
(74) Attorney, Agent, or Firm—Frishauf, Holtz, Goodman, Langer & Chick, P.C.

(57) ABSTRACT

A zoom lens barrel wherein its cam ring has three sets of three cam grooves for advancing or retracting a first group frame, a focus frame and third group frame. The three cam grooves include a cam follower introducing groove connected to ends of two cam grooves for the focus frame and a third group frame and a joint groove for joining two cam grooves for the first group frame and the focus frame. When inserting a cam follower of the first group frame into the cam groove, after it is inserted into the introducing groove, it is passed through the cam groove for the focus frame and then, passed through the joint groove and fit to the cam groove for the first group frame. Further, when inserting the cam followers of the focus frame and third group frame into the cam groove, after it is inserted from the introducing groove, it can be fit to the focus frame and third group frame separately. Therefore, the assembly is facilitated and it is possible to provide a zoom lens barrel ensuring an excellent space efficiency and achieving reduction of the size and compactness.

20 Claims, 8 Drawing Sheets

ZOOM LENS BARREL

This application claims benefit of Japanese Application No. Hei11-368192 filed in Japan on Dec. 24, 1999, the contents of which are incorporated by this reference.

BACKGROUND OF THE INVENTION

1. Field of the invention

The present invention relates to a structure of a zoom lens barrel having a moving frame (frame member) to be advanced or retracted through a cam follower.

2. Related Art Statement

In recent years, compact cameras have been reduced in size and employ a high-magnification zoom function and other novel functions. Corresponding to these trends, various types of moving frame retracting mechanisms of a lens barrel have been proposed.

For example, a lens barrel disclosed in Japanese Patent Application Laid-Open No. HEI7-191249 has plural lens holding frames capable of being advanced or retracted and a cam frame for advancing or retracting the lens holding frames. The cam frame has three cam grooves wherein three cam followers provided on the lens holding frame are fit slidably coupled thereto. By driving the cam frame, the cam followers are driven along the cam grooves so as to advance or retract the plural lens holding frame. The three cam grooves are formed such that a part of a cam curve line of a cam groove intersects an introduction groove for introducing the cam follower. Therefore, compactness of the cam frame is achieved.

However, according to the lens barrel disclosed in the aforementioned Japanese Patent Application Laid-Open No. HEI7-191249, when a cam follower is located at a intersecting position between the cam follower introducing groove and the cam groove, there is a possibility that a smooth motion of the cam follower may be hampered. Further, the cam curve lines have to be formed by shifting their phase so that when a cam follower is located at an intersecting position, the other two cam followers are never located at intersecting positions of the cam grooves. Thus, there is a restriction about the configuration of the cam frame.

SUMMARY OF THE INVENTION

The present invention has been achieved to solve the above-described problems and an object of the invention is to provide a zoom lens barrel having a cam follower and cam grooves for advancing or retracting a lens holding frame for holding a lens directly or indirectly, and another object of the invention is to provide a lens barrel system incorporating the zoom lens barrel ensuring an excellent space efficiency and achieving reduction of the size and compactness.

The zoom lens barrel of the present invention has a first lens holding frame capable of moving in the direction of the lens optical axis and having a first cam follower, a second lens holding frame capable of moving in the direction of the lens optical axis and having a second cam follower and a cam ring having first and second cams which maintain a sliding contact with the first and second cam followers so as to control movement of the first and second lens holding frames in the direction of the optical axis. An end portion of the second cam includes an opening portion at a cam ring end face in which the first and second cam followers are introduced. An end of the first cam is joined to the other end of the second cam as if the first cam is returned from the other end of the second cam. The first cam and second cam are formed to extend side by side. When the cam ring is rotated, the first and second cam followers are driven by the first and second cams in the direction of the lens optical axis, so that the first and second lens holding frames are moved in the direction of the lens optical axis.

The other features and benefits of the present invention will be apparent from the following description.

DETAILED DESCRIPTION OF THE PREFERRED EMBODIMENTS

Hereinafter, the preferred embodiments of the present invention will be described in detail with reference to the accompanying drawings.

Figure 1:
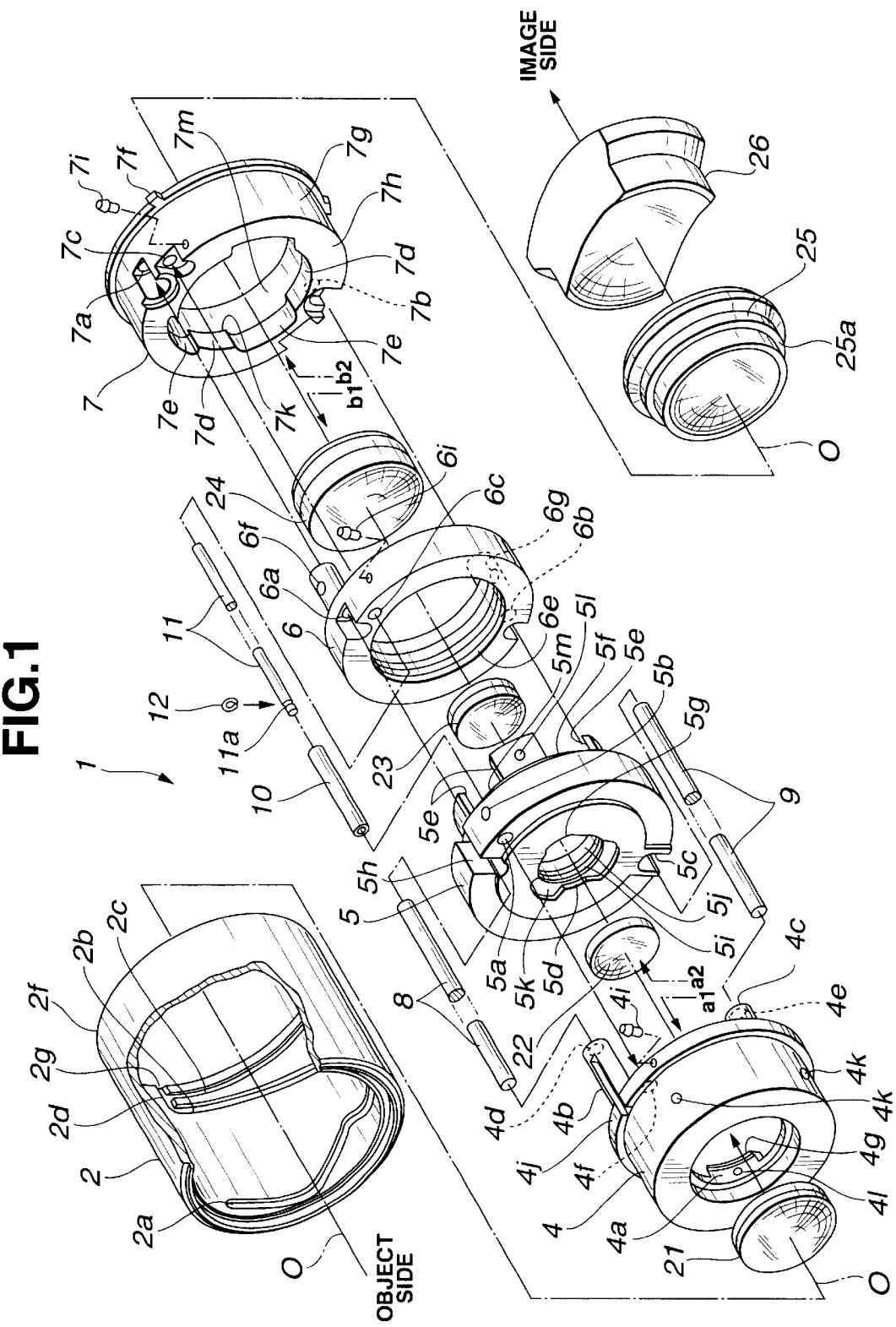
FIG. 1 is an exploded view of a zoom lens barrel (lens barrel) according to an embodiment of the present invention.
Figure 2:
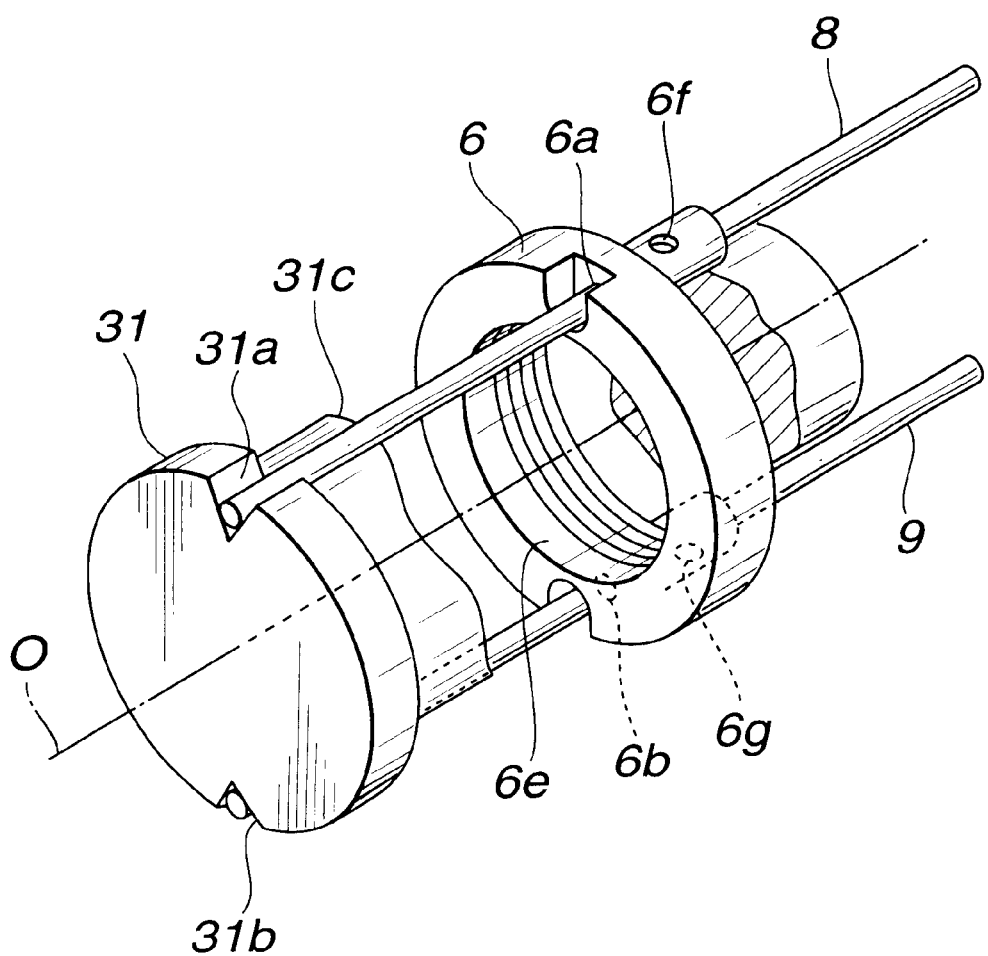
FIG. 2 is a perspective view showing a state in which a guide shaft and a focus holding frame are supported by a first assembly jig for guide shaft positioning in a lens barrel of the embodiment.
Figure 3:
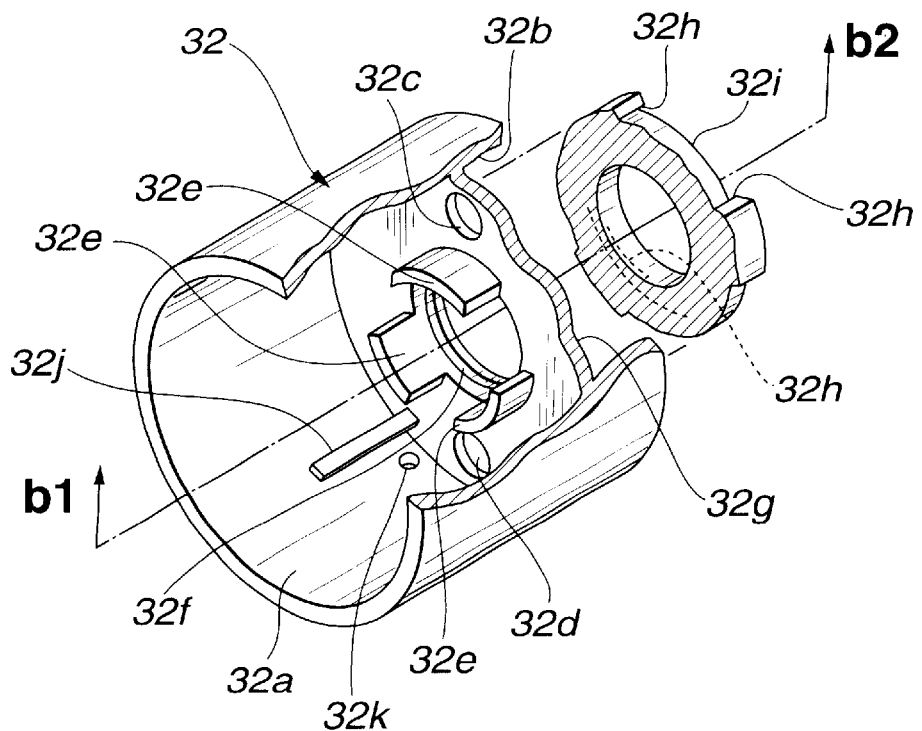
FIG. 3 is a perspective view of a second assembly jig for lens/frame member positioning to be applied to the lens barrel assembly of the embodiment.
Figure 4:
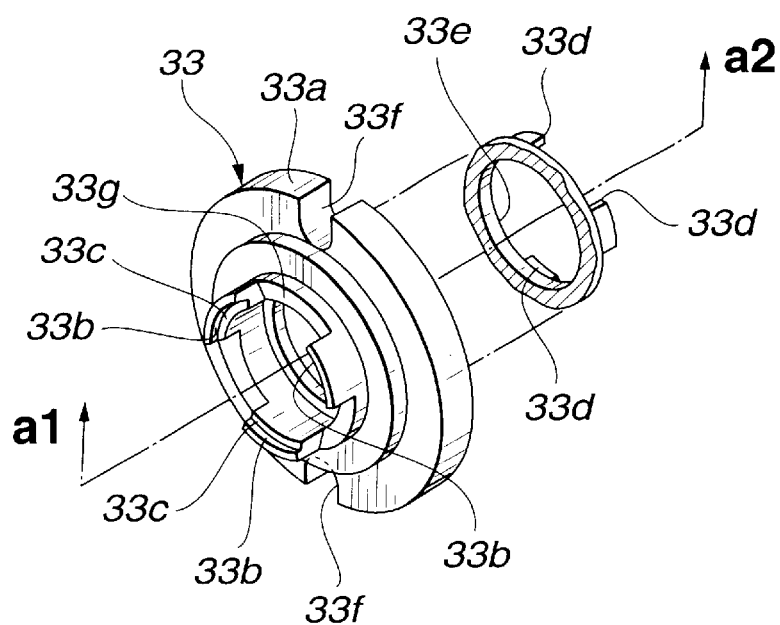
FIG. 4 is a perspective view of a third assembly jig for lens/frame member positioning to be applied to the lens barrel assembly of the embodiment.
Figure 5:
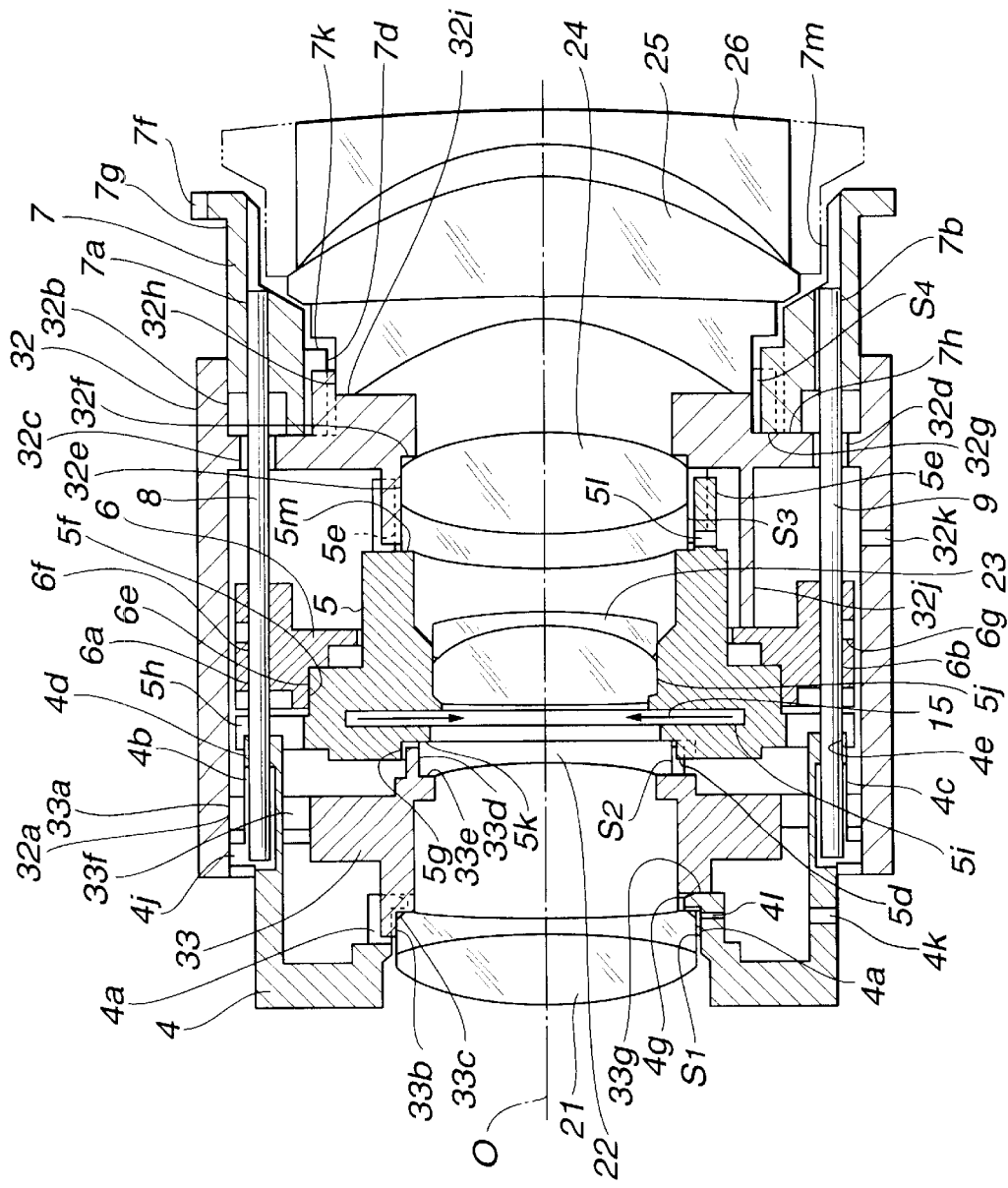
FIG. 5 is a longitudinal sectional view showing an assembly condition of the lens barrel using the second and third assembly jigs in the lens barrel of the embodiment.
Figures 6A, 6B, 6C:
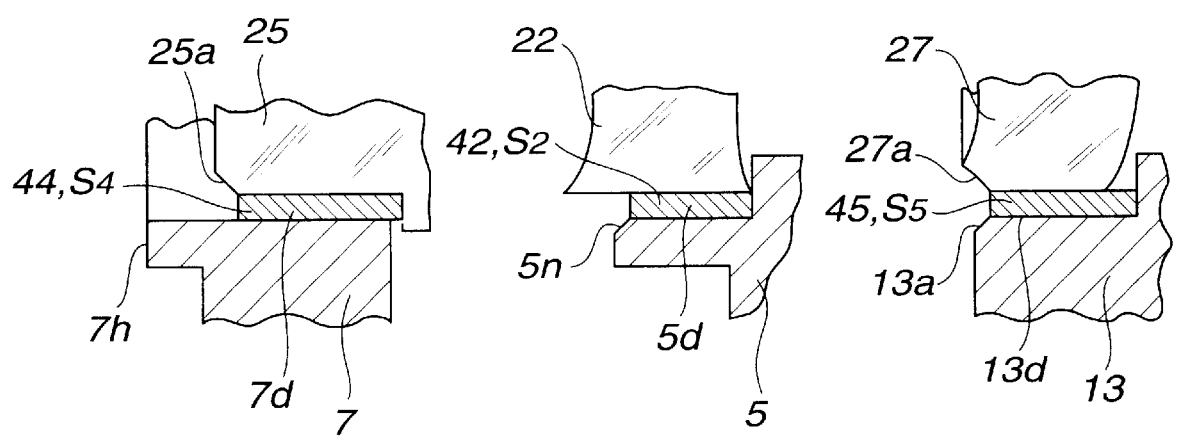
FIG. 6A is an enlarged sectional view showing a section of a bonding portion between the lens group and frame member in the lens barrel of the embodiment such that the frame member is protruded relative to the lens group.
FIG. 6B is an enlarged sectional view showing a section of a bonding portion between the lens group and frame member in the lens barrel of the embodiment such that the lens group is protruded relative to the frame member.
FIG. 6C is an enlarged sectional view showing a section of a bonding portion between the lens group and frame member in the lens barrel of the embodiment such that the frame member and the lens group are located on substantially the same surface.
Figure 7:
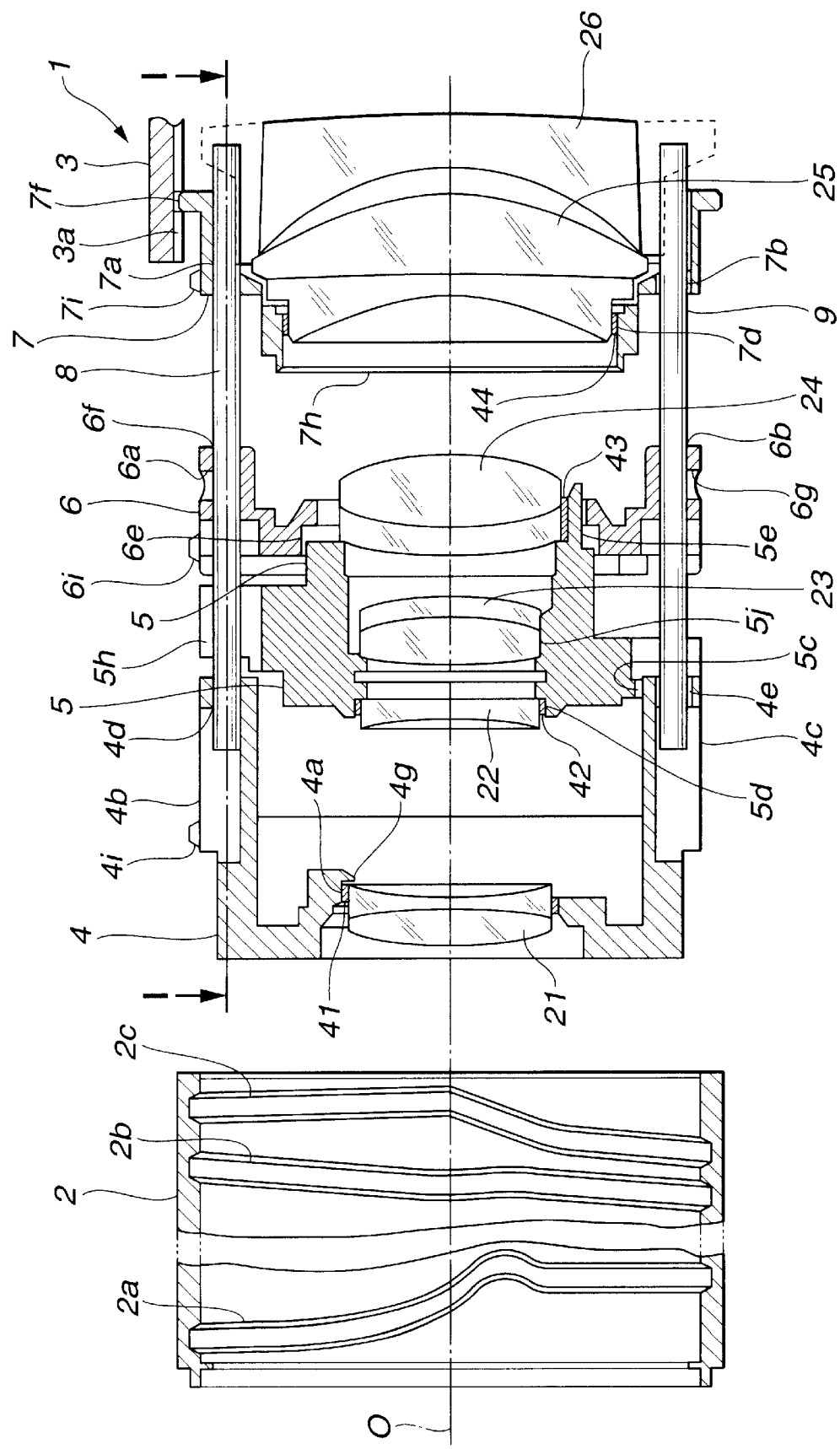
FIG. 7 is a longitudinal sectional view after the lens barrel of the embodiment is assembled.
Figure 8:
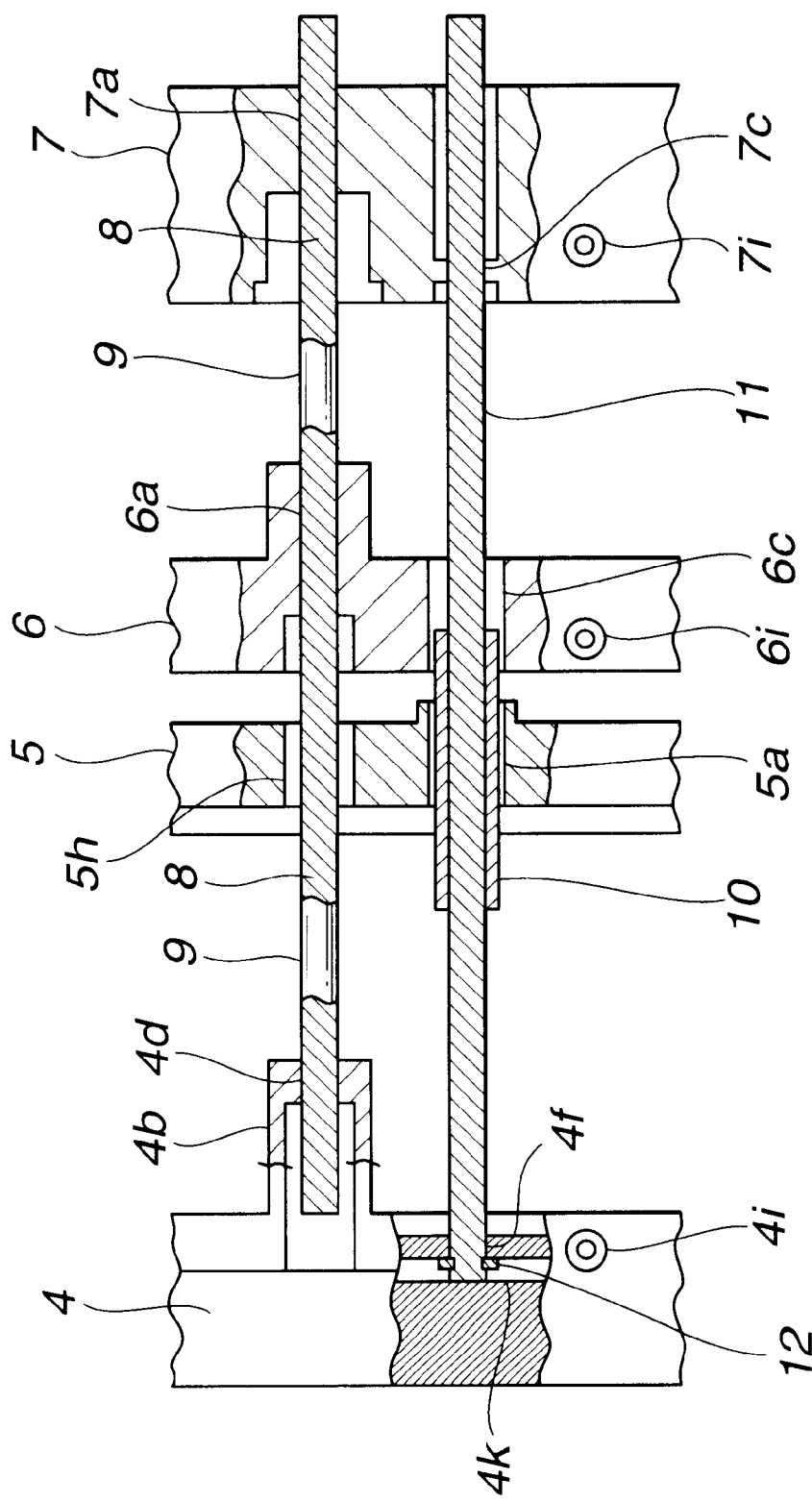
FIG. 8 is a sectional view (partial sectional view) taken along the line I—I of FIG. 7.
Figure 9:
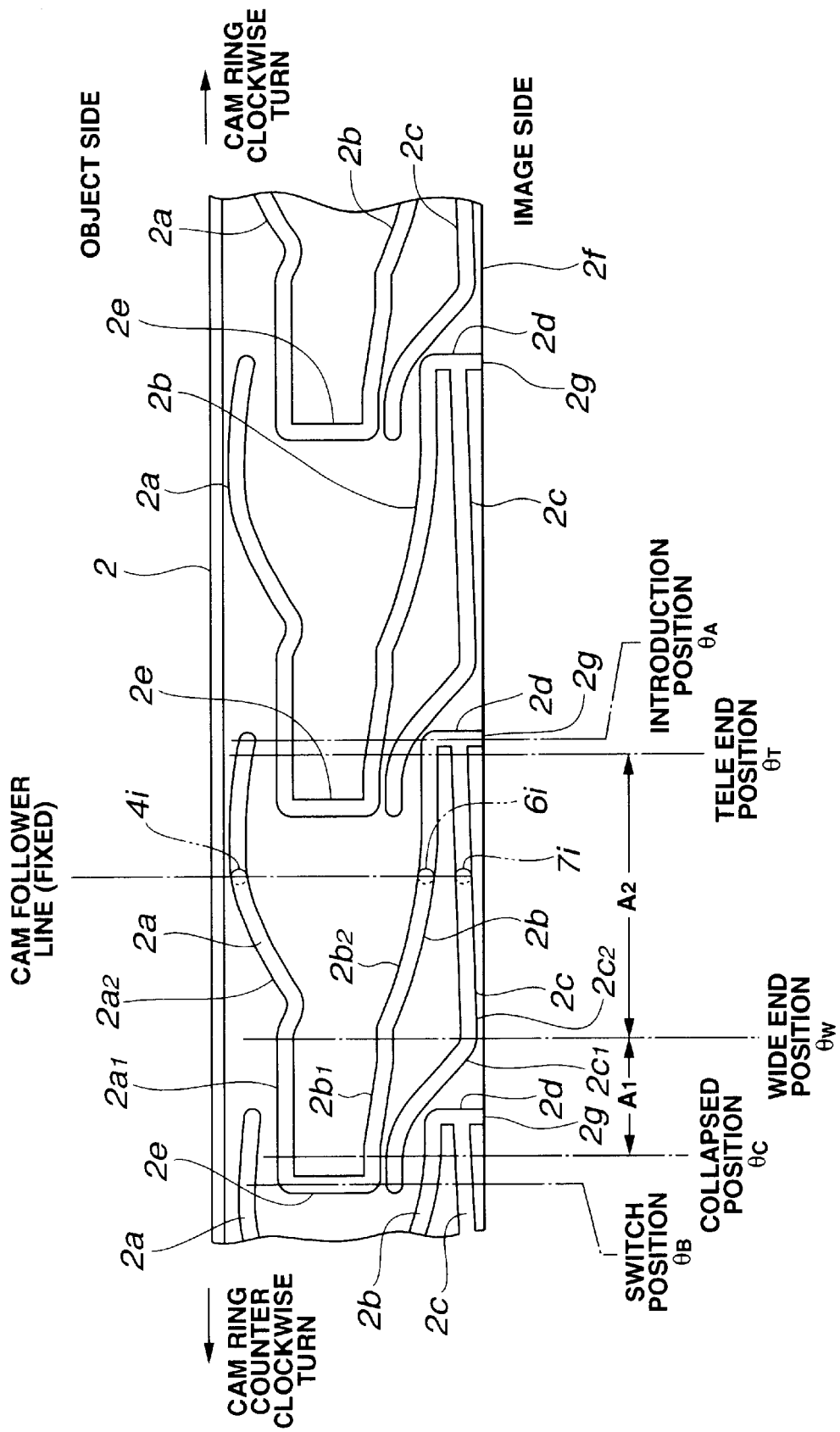
FIG. 9 is a development view of a cam groove in cam ring applied to the lens barrel of the embodiment.

FIG. 1 is an exploded view of a zoom lens barrel (hereinafter referred to as lens barrel) according to an embodiment of the present invention. FIG. 2 is a perspective view showing a state in which a guide shaft and a focus holding frame of the lens barrel are supported by a first assembly jig for guide shaft positioning. FIG. 3 is a perspective view of a second assembly jig for a lens/holding frame member positioning of the lens barrel. FIG. 4 is a perspective view of a third assembly jig for the lens/holding frame member positioning of the lens barrel. FIG. 5 is a longitudinal sectional view showing an assembly condition of the lens barrel using the second and third assembly jigs for the lens/holding frame positioning. FIGS. 6A, 6B, 6C are enlarged sectional views showing a section of the bonding portion between the lens group and the lens holding frame in the lens barrel. FIG. 6A shows a case in which the lens holding frame is protruded relative to the lens group. FIG. 6B shows a case where the lens is protruded relative to the lens holding frame. FIG. 6C shows a case where the lens holding frame and the lens are located on substantially the same surface. FIG. 7 is a longitudinal sectional view after the lens barrel is assembled. FIG. 8 is a sectional view taken along the line I—I of FIG. 7, indicating a partial section of a portion around the guide shaft in the lens barrel. FIG. 9 is a development view of a cam groove in a cam ring applied to the lens barrel.

In the above description, it is assumed that an object side of the lens barrel is forward and an image side is backward. A rotation direction of a cam ring or the like is indicated when viewed from forward (object side).

The lens barrel 1 of this embodiment is incorporated in a zoom camera or used as an interchangeable type zoom lens barrel. As shown in FIG. 1 and the like, the lens barrel 1 includes a float key 3 (see FIG. 7) whose rotation is restricted and which is supported so as to be capable of being advanced or retracted, a cam ring 2 which is capable of being advanced and retracted together with the float key 3 and which is supported rotatably, a first group frame 4, which is a first lens holding frame (moving frame) advanced or retracted relatively by the cam ring 2 in the direction of the lens optical axis O, a first group lens (optical element) 21 held by the first group frame 4, a focus holding frame 6, which is a second lens holding frame (moving frame) advanced or retracted relatively by the cam ring 2, a focus frame 5, which is a lens holding frame (moving frame) advanced or retracted by a focus driving mechanism (not shown) relative to the focus holding frame 6, second group lens (front) 22, second group lens (middle) 23 and second group lens (rear) 24, which are focus lenses held by the focus frame 5 so as to compose the second group lens (optical element), and a shutter 15 (see FIG. 5) incorporated in the focus frame 5. Further, the lens barrel 1 includes a third group frame 7, which is a third lens holding frame (moving frame) advanced or retracted relatively by the cam ring 2, a third group lens (front) 25 and third group lens (rear) 26 which compose the third group lens (optical element) held by the third group 7. Still further, the lens barrel 1 includes guide shafts 8, 9 which are guide members fixed to the focus holding frame 6 and for supporting the first group frame 4 and the third group frame 7 slidably and a guide shaft 11 which is supported by the first group frame 4 and the third group frame 7 for supporting the focus frame 5 slidably through the sleeve 10.

As shown in the development diagram of FIG. 9, the cam ring 2 has three pairs of cam portions in which a length direction of a groove thereof includes three rows along the rotation direction.

Each pair of the cam portion includes of a cam groove 2a which is a first cam to which a first cam follower 4i, described later, is fit slidably, a cam groove 2b, which is a second cam to which a second cam follower 6i, described later, is fit slidably, a cam groove 2c, which is a third cam to which a third cam follower 7i, described later, is fit slidably, a cam follower introducing groove 2d, which is an insertion introducing portion for assembly of the cam followers 4i, 6i, 7i and a joint groove 2e, which is an insertion joint portion for assembly of the cam follower 4i.

The cam follower introducing groove 2d is an introducing groove leading from an opening portion 2g in an end face 2f on image side of the cam ring 2 to ends of the cam grooves 2a, 2c. The introducing groove 2d is formed at an introducing position θA outside a tele end position θT of a rotation position of the cam ring 2, which will be described later, such that it is parallel to an optical axis O.

The joint groove 2e is a joint portion connected to an end of the cam groove 2a to an end of the cam groove 2b. The joint groove 2e is formed at a switch position θB outside a collapsed position θC of a rotation position of the cam ring 2, which will be described later, such that it is parallel to the optical axis O.

The cam groove 2c is provided on the image side of the cam ring 2 in a range from the introducing position θA to the switch position θB and includes a collapsed range cam groove 2c1 existing inside that range between the collapsed position θC and a wide end position θW and a zoom range cam groove 2c2 existing between a wide end position θW and a tele end position θT.

The aforementioned cam grooves 2a, 2b are joined through the joint groove 2e and are formed to extend side by side in a range from the introducing position θA of the rotation position of the cam ring 2 to the switch position θB. Then, the cam grooves 2a, 2b have collapsed range cam grooves 2a1, 2b1 existing between the collapsed position θC and the wide end position θW inside the aforementioned range and zoom range cam grooves 2a2, 2b2 existing between the wide end position θW and tele end position θT.

Therefore, in a cam portion provided in the cam ring 2, the opening portion 2g on the end face 2f of the image side leads to the cam follower introducing groove 2d. The introducing groove 2d leads to the cam grooves 2c and 2b. The cam groove 2b leads to the joint groove 2e. The joint groove 2e lead to the cam groove 2a.

The cam grooves 2a, 2b form a pair of continuous cam grooves connected through the joint groove 2e. Three pairs of the continuous cam grooves are provided in the cam ring 2. The aforementioned three pairs of the continuous cam grooves 2a, 2b are disposed in an inner circumferential face of the cam ring 2 such that they overlap each other in the rotation direction in a condition that they do not cross each other but invade each other.

The cam ring 2 incorporated in the lens barrel 1 is extended from the collapsed position in the direction of the optical axis O along the float keys 3 by an extension driving mechanism (not shown) to a photographing position. Further, the cam ring 2 is rotated from the collapsed position θc to the wide end position θW by a zoom driving mechanism (not shown).

Upon zooming operation, the cam ring 2 is rotated in an interval from the wide end position θW to the tele end position Θt (see FIG. 9). Accompanied by the rotation, the cam follower is driven through each cam groove so that respective members of the first group frame 4 are advanced or retracted. The position of the cam ring 2 indicated by the rotation position (rotation angle) θ is indicated by a relative rotation position of the aforementioned cam followers 2a, 2b, 2c with respect to the cam follower rows (fixed).

The first group frame 4 includes an outer peripheral portion 4j, a backward protruded lens holding portion 4a, which is protruded along the optical axis and has a pawl portion 4g, backward protruded boss portions 4b, 4c disposed at two positions up and down in the frame portion and extended along the optical axis, a shaft hole 4f in which a front end of a guide shaft 11 is to be fit, and three cam followers 4i attached to the outer peripheral portion and capable of entering the cam groove 2a.

An inner circumference of the protruded lens holding portion 4a has a tolerance securing a gap for loose fitting with respect to an outer circumference of the first group lens 21 to be mounted. This gap is of an appropriate dimension absorbing disparity of the dimensions of relating frames and lens member and a dimension allowing an adhesive agent to be filled therein. Additionally, there is a gap in the optical axis O direction between the position of the pawl portion 4g and the face of the first group lens 21. That gap absorbs the disparity of the dimension of the relating frames of the optical axis O and lens members and a dimension allowing adhesive agent to be filled therein.

The boss portion 4b has the shaft hole 4d which the guide shaft 8 is capable of being fit slidably when it is precision fit. On the other hand, the boss portion 4c has an long hole 4e in which the guide shaft 9 is capable of being fit slidably when it is precision fit around the optical axis O. The aforementioned shaft hole 4f is a hole having a relatively small depth in which the guide shaft 11 is fit when it is precision fit.

Meanwhile, the precision fitting condition refers to a state in which there is no looseness between the hole portion and shaft portion or a state in which the fitting is attained with extremely little looseness. Fitting with loose, which will be described later, refers to a state in which the fitting is attained with a gap. Further, fitting slidably, which will be described later, refers to a fitting condition with a slight gap.

The focus holding frame 6 has shaft holes 6a, 6b disposed up and down in the frame portion and in which the guide shafts 8, 9 are fit with loose, an escape hole 6c disposed sideways of the shaft hole 6a and which the guide shaft 11 passes through, three cam followers 6i capable of being fit into the cam groove 2b, and a fitting inner circumferential portion 6e. Further, the focus holding frame 6 contains a focus driving portion such as a feeding screw mechanism for focus-driving the focus frame 5, which will be described later, (not shown).

The guide shafts 8, 9 are bonded into the shaft holes 6a, 6b with the assembly jig 31 for guide shaft positioning, which will be described later, in a positioning condition. The escape hole 6c is an escape hole in which a sleeve 10 is capable of entering with the guide shaft 11. The fitting inner circumferential portion 6e is capable of being fit to the fitting outer circumferential portion 5f of the focus frame 5, which will be described, in a sliding condition.

The focus frame 5 includes lens holding portions 5d and jig escaping portions 5g, provided by dividing a front inner circumferential portion to three parts, shutter incorporating concave portion 5i and lens holding portion 5j provided in the inner circumferential portion in the center, three protruded lens holding portions 5e extended in the optical axis direction provided in the rear and an outer circumferential portion 5f to be fit to the focus holding portion 6 provided on an outer circumference in the rear. Further, the focus frame 5 includes an escape portion 5h for the guide shaft 8 disposed in an upper portion of the frame, a sleeve fitting hole 5a disposed sideways of the escape portion 5h and U-shaped groove 5c disposed in a lower portion of the frame and capable of being fit to and making a sliding contact with the boss portion 4c of the first group frame 4 when it is precision fit.

The inner circumferences of the lens holding portion 5d and lens holding portion 5e have a tolerance of dimension containing a gap with respect to the outer diameters of the second group lens (front) 22 and second group lens (rear) 24 to be mounted, thereby absorbing disparity of dimension of relating frames and lens members and providing a sufficient gap allowing adhesive agent to be filled therein.

A lens contacting face 5k which makes a contact with a lens face of the second group lens (front) 22 to be mounted is provided in the rear in the direction of the optical axis O of the lens holding portion 5d. Further, a lens contacting face 5m, which makes contact with a lens face of the second group lens (rear) 24, is provided forward in the direction of the optical axis O of the lens holding portion 5e.

The lens holding portion 5j has an inner periphery which an outer circumference of the second group lens (middle) 23 is precision fit to and the second group lens (middle) 23 is directly bonded thereto.

The diameter of the sleeve fitting hole 5a is as large as the sleeve 10 can be fit thereto with loose, thereby absorbing disparity of dimension of the relating frames and lens members and providing a dimension allowing adhesive agent to be filled therein.

The third group frame 7 includes a front end face portion 7h, an outer peripheral portion 7g, lens holding portions 7d and jig escaping portions 7e divided to three sections by the front end face portion 7h, a shaft hole 7a disposed in a upper portion and in which the guide shaft 8 is fit slidably in precision fitting condition, a long hole 7b disposed in a lower portion of the frame and which the guide shaft 9 is fit slidably in the direction of the optical axis O around the optical axis O in precision fitting condition, and a shaft hole 7c relatively short disposed sideways of the shaft hole 7a and which the guide shaft 11 is precision fit.

Further, the third group frame 7 includes three cam followers 7i attached to the outer peripheral portion 7g and capable of being fit to the cam groove 2c and three advancement guide protrusions 7f disposed on a rear flange of the outer peripheral portion 7g.

Here, the reason why the aforementioned shaft hole 4f and the shaft hole 7c are relatively short fitting holes will be described. While these two shaft holes 4f and 7c are fit to the guide shaft 11, the guide shaft 11 is capable of being tilted slightly because such a relatively short fitting length is provided. How much the guide shaft 11 is capable of being tilted depends upon a minimum distance between the first group frame 4 and the third group frame 7 and positional accuracies of the shaft holes 4f, 7c with respect to the guide shaft holes 4d, 7a in the first group frame 4 and third group frame 7. That is, it is largely relating to an error of a relative distance between the guide shaft hole 4d and the shaft hole 4f and an error of a relative distance between the guide shaft hole 7a and the shaft hole 7c. The guide shaft 11 needs to be tilted more as these two errors are absorbed. Naturally, if these errors are small, the fitting accuracy between the guide shaft 11 and the shaft holes 4f, 7c is intensified, so that if the fitting length is increased, the tiltable angle of the guide shaft 11 may be small. However, if these errors are large, the fitting accuracy must be lowered while the fitting length must be shortened. In this case, the assembly accuracy of the lens barrel drops.

In other words, the tiltable angle of the guide shaft is determined by the aforementioned minimum distance and two errors. Then, the fitting accuracy between the hole and guide shaft and the fitting length are determined. Generally, that angle should be determined by the fitting length without lowering the fitting accuracy. That is, the guide shaft 11 can be tilted by decreasing the fitting length.

An inner circumference of the lens holding portion 7d has a tolerance of dimension having a gap with respect to the outer diameter of a fitting portion of the third group lens (front) 25 to be mounted, thereby absorbing disparity of dimension of the relating frames and the lens member and providing a dimension allowing adhesive agent to be filled with.

There is a gap in the direction of the optical axis between an inner end face 7k of the lens holding portion 7d and a flange face 25a of the third group lens (front) 25. That gap absorbs disparity of dimension of the relating frames and lens members and provides a sufficient gap allowing adhesive agent to be filled with.

When assembling the lens barrel 1 of this embodiment having such a structure, the first assembly jig 31 for guide shaft positioning shown in FIG. 2, the second assembly jig 32 for lens/holding frame positioning shown in FIGS. 3, 4 and the third assembly jig 33 are used.

As shown in FIG. 2, the first assembly jig 31 for guide shaft positioning has V-grooves 31a, 31b disposed up and down in an outer periphery for holding the guide shafts 8, 9 at a predetermined separating distance in parallel to the optical axis O and an outer circumferential portion 31c for positioning capable of being precision fit to the fitting inner circumferential portion 6e of the focus holding frame 6.

The second assembly jig 32 for lens/holding frame positioning is a cylinder partitioned to front and rear by a wall portion (a backward wall face 32g is assumed to be 32g) as shown in FIG. 3 and has a forward inner peripheral face 32a and a backward inner peripheral face 32b. The forward inner peripheral face 32a has a stopper 32j for positioning the focus holding frame 6 in the direction of the optical axis O.

A front face of the wall portion has three protruded lens supporting portions (inner peripheral face) 32e which are protruded in the direction of the optical axis and a lens contact face 32f which is disposed in the rear of the supporting portions. Further, a rear face thereof has three protruded lens supporting portions (inner peripheral face) 32h, which are protruded in the direction of the optical axis and a lens contact face 32i, which is disposed in front of the inner peripheral portion. Further, the aforementioned wall portion has escaping holes 32c, 32d.

The forward inner peripheral face 32a is an inner peripheral face which the outer peripheral portion 4j of the first group frame 4 and the outer peripheral face 33a of the assembly jig 33 are capable of being precision fit. The backward inner peripheral face 32b is an inner peripheral face which the outer peripheral portion 7g of the third group frame 7 is capable of being precision fit.

The lens supporting portions (inner peripheral face) 32e, 32h are inner peripheral faces which the outer peripheries of the second group lens (rear) 24, third group lens (front) 25 are capable of being precision fit.

As shown in FIG. 4, the second assembly jig 33 for the lens/holding frame positioning is a substantially circular jig having an outer peripheral face 33a. Three divided protruded lens supporting portions 33b are provided such that they are protruded in the direction of the optical axis and lens contact faces 33c are provided in the rear of each inner peripheral portion. A rear face of the second assembly jig 33 has three divided protruded lens supporting portions (inner peripheral faces) 33d, which are protruded in the direction of the optical axis, lens contact faces 33e provided in the rear of each inner peripheral portion and escaping portions 33f provided up and down in the outer frame.

Inner peripheral faces of the lens supporting portions 33b, 33d are inner peripheral faces which the outer peripheries of the first group lens 21 and second group lens (front) are capable of being precision fit.

To attach the guide shafts 8, 9 to the focus holding frame 6 when assembling the lens barrel 1, as shown in FIG. 2, using the first assembly jig 31, the outer circumferential portion 31c for frame positioning is fit to the fitting inner circumferential portion 6e of the focus holding frame 6.

Then, the guide shafts 8, 9 inserted through the shaft holes 6a, 6b in the focus holding frame 6 are fixed in the V-grooves 31a, 31b of the assembly jig 31. Because the shaft holes 6a, 6b have a gap with respect to the guide shafts 8, 9, the guide shafts 8, 9 are kept at a predetermined position in the direction of the optical axis with a predetermined distance between the shafts such that they are parallel to the optical axis.

With the above supporting condition, adhesive agent (fixing agent) is poured through adhesive agent pouring holes 6f, 6g in the focus holding frame 6 so as to fix the guide shafts 8, 9 in the shaft holes 6a, 6b.

Next, the assembly jigs 32, 33 are employed in order to assemble respective lens barrel components around the focus holding frame 6 having the guide shafts 8, 9. Meanwhile, upon assembly, the assembly jig 32 shown in FIG. 3 is inserted between insertion positions b1 and b2 with respect to the lens barrel 1 shown in FIG. 1. Then, the assembly jig 33 shown in FIG. 4 is inserted between insertion positions a1 and a2 with respect to the lens barrel 1 shown in FIG. 1.

In the assembly jig 32 shown in the longitudinal sectional view of FIG. 5, the outer peripheral face of the second group lens (rear) 24 is fit to the inner peripheral face of the lens supporting portion 32e such that the second group lens face is in contact with the lens contact face 32f.

On the other hand, the outer peripheral face of the second group lens (front) 22 is fit to the inner peripheral face of the lens supporting portion 33d of the assembly jig 33 such that the aforementioned lens face is brought into contact with the lens contact face 33e.

Then, the focus holding frame 6 having the guide shafts is inserted up to a reference position where it comes into contact with a stopper 32j of the assembly jig 32, on which the lens is mounted, from forward in the direction of the optical axis.

Further, the fitting outer circumferential portion 5f of the focus frame 5, to which the second group lens (middle) 23 is bonded, is fit to the fitting inner circumferential portion 6e of the focus holding frame 6 and inserted until the lens contact face 5m of the focus frame 5 comes into contact with the front lens of the second group lens (rear) 24. At this time, the aforementioned stopper of the jig is set such that the focus holding frame 6 is floated with a gap with respect to the stopper in the direction of the optical axis.

Then, the guide shafts 8, 9 are inserted into the escaping portion 5h and U-groove 5c in the focus frame 5. Further, the sleeve 10 is inserted into the sleeve fitting hole 5a in the focus frame 5 and inserted into the escaping hole 6c in the focus holding frame 6.

After that, the aforementioned assembly jig 33, on which the lens is mounted, is fit to the forward inner peripheral face 32a of the assembly jig 32 and the rear lens face of the second group lens (front) 22 is inserted until it comes into contact with the lens contact face 5k of the focus frame 5. At this time, the protrusion of the lens supporting portion 33d of the assembly jig 33 is fit into the escaping portion 5g of the focus frame 5.

Then, the first group frame 4 is installed. Before the installation, the guide shaft 11 is inserted into the shaft hole 4f in the first group frame 4 and an E-ring 12 is embedded into an E-ring groove 11a in a front end of the guide shaft (See FIG. 8). The guide shaft 11 is capable of being advanced or retracted with the first group frame 4 by this E-ring 12.

The first group frame 4 with the guide shaft 11 is inserted up to a reference position in the direction of the optical axis in front of the assembly jig 33, where it comes into contact with a stopper (not shown) of the assembly jig 32 or an end of the pawl portion 4g of the first group frame 4 comes into contact with the escaping portion 33g in the jig 33. At this time, the guide shaft 8 is fit into the shaft hole 4d in the first group frame 4 and the guide shaft 9 is fit into the long hole 4e in the first group frame 4.

Further, the boss portion 4c of the first group frame 4 is fit into the U-groove 5c of the focus frame 5. After fitting the sleeve 10 on the focus frame 5, the guide shaft 11 is held such that it is passed through the escaping hole 6c in the focus holding frame 6.

After that, if the first group lens 21 is inserted into the first group frame 4, the first group lens 21 comes into contact with the lens contact face 33c of the jig 33 such that it is floated with respect to the first group frame 4. Consequently, the outer circumference of the first group lens 21 is precision fit to the lens supporting portion 33b and supported by the jig 33.

Subsequently, the third group frame 7 is fit loosely to the backward inner peripheral face 32b of the assembly jig 32 and then inserted up to a reference position in the direction of the optical axis where an end face portion 7h thereof comes into contact with the wall portion 32g. At that time, the guide shafts 8, 9, 11 are fit into the shaft hole 7a, long hole 7b and shaft hole 7c. The protrusion of the lens supporting portion 32h of the jig 32 is fit into the escaping portion 7e of the third group frame 7.

With the third group frame 7 inserted, the third group lens (front) 25 is fit into the inner peripheral portion of the lens supporting portion 32h of the assembly jig 32 and a lens end face thereof is brought into contact with the lens contact face 32i for positioning.

With the respective lens barrel components set in the aforementioned assembly jigs 32, 33, the first group frame 4 and the third group frame 7 are positioned at the optical axis O position at a predetermined precision in the direction of the optical axis O through the respective fitting shaft holes by the guide shafts 8, 9 supported by the focus holding frame 6 (see FIG. 7). Further, a rotation phase position of the focus frame 5 is determined at a predetermined precision around the optical axis O through the boss portion 4c of the first group frame 4 (see FIG. 7).

On the other hand, the first group lens 21, second group lens (front) 22, second group lens (rear) 24 and third group lens (front) 25 are precision fit to the inner peripheral face of the lens supporting portion, which is divided to three parts, and centered by the assembly jigs 32, 33. Additionally, they are brought into contact with the contact portions so that they are positioned in the direction of the optical axis O.

As described above, the respective lens groups are supported such that they are floated at an accurate position by the assembly jig 32.

Meanwhile, the outer peripheries of the first group frame 4 and third group frame 7 may be theoretically of a dimension allowing a loose fitting to the inner periphery of the jig 32. The reason is that the positioning accuracy of the guide shafts 8, 9 has been already determined.

The lens holding portions, which are divided to three sections each, of the first group frame 4, focus frame 5 and third group frame 7 are located along a circumference of each of the corresponding lens supporting inner peripheral faces, which are divided to three sections each, of the assembly jigs, 32, 33 and positioned with an appropriate gap for adjustment or bonding with respect to the outer peripheral face of each lens.

Further, with respect to a lens face of each lens in the direction of the optical axis O, there is an appropriate gap for adjustment of a position in the direction of the optical axis O and bonding between the pawl portion 4g of the first group frame 4 or the lens holding end face 7k of the third group frame 7 and a flange face (flange face 25a of the third group lens 25) of each lens.

The guide shaft 11 fit and inserted into the focus frame through the sleeve 10 supported with loose is maintained in an appropriate condition in the shaft hole even if there is disparity in the shaft hole between the first group frame 4 and third group frame 7 positioned by the guide shafts 8, 9.

If a leaf spring type lens holding mechanism or the like is incorporated to prevent deviation or slip-out of each lens mounted on the lens supporting portion although it is not indicated on each lens supporting portion of each of the assembly jigs 32, 33 shown in FIGS. 3, 4, assembly efficiency is further improved.

The sleeve and lens of the lens barrel 1 are bonded with adhesive agent (fixing agent) in a setting condition by the assembly jigs 32, 33.

First, bonding of the sleeve 10 is carried out by pouring adhesive agent through the adhesive agent pouring hole 5b leading to the sleeve fitting hole 5a provided in the outer peripheral portion of the focus frame 5.

Bonding of the first group lens 21 is carried out by pouring adhesive agent into a lens holding gap S1 formed by the lens holding portion 4a, pawl portion 4g and first group lens 21 through an opening hole 4k, 4l provided in the outer periphery of the first group frame 4 and the lens holding portion 4a (see FIG. 5).

Instead of the pouring of the adhesive agent, it is permissible to coat the lens holding portion 4a of the first group frame 4 with adhesive agent for the bonding.

Bonding of the second group lens (front) 22 is carried out by applying adhesive agent onto the lens holding portion 5d of the focus frame 5 preliminarily and then filling a lens holding portion gap S2 formed by the lens holding portion 5d, lens contact face 5k and the outer diameter of the second group lens (front) 22 with adhesive agent.

Bonding of the second group lens (rear) 24 is carried out by pouring adhesive agent into a lens holding portion gap S3 formed by the lens holding portion 5e, lens contact face 5m and the outer diameter of the second group lens (rear) 24 through an opening hole 32k provided in the outer periphery of the assembly jig 32.

Instead of the pouring of the adhesive agent, it is permissible to coat the lens holding portion 5e of the focus frame 5 with adhesive agent for the bonding.

Bonding of the third group lens (front) 25 is carried out by applying adhesive agent onto the lens holding portion 7d of the third group frame 7 preliminarily and filling a lens holding portion gap S4 formed by the lens holding portion 7d, inside end face 7k and the outer diameter of the third group lens (front) 25 with adhesive agent through an opening (not shown) provided in the outer periphery of the assembly jig 32.

Here, by bringing the third group lens (rear) 26 into contact with a rear side face of the third group lens (front) 25, adhesive agent is applied into a gap between the inner peripheral face 7m formed the third group frame 7 and the outside diameter of the third group lens (rear) 26 for bonding.

When installing the third group lens (rear) 26, it is permissible to install the third group lens (rear) 26 while observing and adjusting alignment thereof entirely with the first group lens 21, second group lenses 22, 23, 24 and the third group lens (front) 25. Alternatively, it is permissible to mount the third group lens (rear) 26 while observing and adjustment alignment thereof with respect to assembly of the third group lens (front) 25 having no third group lens (rear) 26 and the third group frame 7.

Meanwhile, if the lens holding portion is filled with adhesive agent, there is a fear that the adhesive agent may flow out to the surface of the lens so that its optical performance may be damaged. Therefore, as shown in FIGS. 6A, 6B, 6C, the lens end face and/or lens holding end face is provided with a chamfered portion so as to prevent a flow out of adhesive agent.

That is, when the lens holding portion is protruded from a lens, for example, as shown in FIG. 6A, an end face 7h of the lens holding portion 7d of the third group lens 7 is protruded from the third group lens (front) 25. Thus, a chamfered portion 25a is provided on an end face of the third group lens 25. By employing this configuration, adhesive agent 44 loaded in the gap S4 hardly flows out from the gap S4 to the surface of the lens.

Further, when the lens is protruded from the lens holding portion, for example, as shown in FIG. 6B, the second group lens (front) 22 is protruded from an end face of the lens holding portion 5d of the focus frame 5. Thus, a chamfered portion 5n is provided on an end face of the lens holding portion 5d. By employing this configuration, adhesive agent 42 loaded in the gap S2 hardly flows out from the gap S2 to the surface of the lens.

Further, a state in which the lens holding portion and the lens are located on the same plane never exists in the lens barrel 1 of this embodiment. Because as shown in FIG. 6C, for example, the end face of the lens holding portion 13d of the lens frame 13 and the lens 27 are located on the same plane if this state is attained, both the end face of the lens holding portion 13d and the outer periphery of the lens 27 are provided with the chambered portions 13a, 27a. By employing this configuration, the adhesive agent 45 loaded in this gap S5 hardly flows out of the gap S5 to the surface of the lens.

If mounting and bonding of the guide shafts, lens and the like by the assembly jigs 32, 33 shown in FIG. 5 are finished, the jigs 32, 33 are removed from the lens barrel 1. At that time, the third group frame 7 is removed from the jig 32 and the first group frame 4 is removed from front with the guide shaft 11.

After the assembly jig 33 is also removed from front, the focus frame 5 and focus holding frame 6 are removed from the assembly jig 32 with the guide shafts 8, 9. FIG. 7 shows a longitudinal sectional view of the lens barrel 1 in a condition that the assembly jigs 32, 33 are removed to assemble those lens frames.

The reason why the removal of the lens barrel 1 is enabled even if the assembly jig 32 having the wall portion (wall face 32g) is used, as described above, is due to the supporting structure of each guide shaft. That is, the guide shaft 11 is supported by the side of the first group frame 4 and the other frame members are supported slidably. Further, the guide shafts 8, 9 are supported by only the focus holding frame 6 disposed in the center and supported slidably by the other frame members.

After the above described installation is finished, the cam ring 2 is incorporated in the lens barrel 1 and then, the first group frame 4, the focus holding frame 6 and three cam followers 4i, 6i, 7i of the third group frame 7 are fit into the three sets of the cam grooves 2a, 2b, 2c in the cam ring 2.

Upon zoom driving, the cam ring 2 is driven from the collapsed position θC indicated by a rotation position with respect to the cam follower to the tele end position θT. As shown in FIG. 9, the cam follower introducing groove 2d is provided at an introduction position θA, which is a rotation position outside the tele end position θT. Further, a joint groove 2e for the cam follower to move is provided at a switch position θB, which is a rotation position outside the other collapsed position θC.

Then, in the respective cam grooves, the cam follower introducing groove 2d and the joint groove 2e are joined to each other and those cam grooves are disposed around the optical axis O such that they are formed to extend side by side in a length direction thereof and the cam groove 2a, cam groove 2b and cam groove 2c are arranged in this order from the object side.

The cam follower introducing groove 2d is a groove in the direction of the optical axis O provided for joining the tele side end portions of the cam groove 2b and cam groove 2c and its insertion mouth is open to a rear side. The joint groove 2e is a groove in the direction of the optical axis O for joining the collapsed side end portions of the cam groove 2a and the cam groove 2b.

When fitting the cam follower into the above described cam grooves, the cam follower introducing groove 2d and the joint groove 2e are used.

First, the cam follower 4i of the first group frame 4 shown in FIG. 7 is positioned at a cam ring insertable position and then, the cam ring 2 is rotated up to the introduction position θA so as to be inserted into the lens barrel 1. Then, the cam follower 4i enters from the opening portion 2g of the cam ring 2 into the cam follower introducing groove 2d.

If the cam follower 4i reaches the end position of the cam groove 2b, the cam ring 2 is rotated clockwise up to the switch position θB. By that rotation, the cam follower 4i passes the cam groove 2b and reaches the joint groove 2e. Then, the cam ring 2 is pushed relatively to the rear side of the lens barrel so that the cam follower 4i is fed to the end position of the cam groove 2a on the front side. Next, the cam ring 2 is rotated counterclockwise so as to be returned to the introduction position θA.

Next, the cam followers 6i, 7i of the focus holding frames 6 and the third group frame 7 are set in the cam ring insertable position. Next, if the cam ring 2 is pushed relatively to the rear side of the lens barrel, the cam followers 6i, 7i enter from the opening portion 2g of the cam ring 2 into the cam follower introducing groove 2d.

Then, if the cam follower 6i reaches the position of the cam groove 2b and the cam follower 7i reaches the position of the cam groove 2c, the cam ring 2 is rotated clockwise. The cam follower 6i enters the cam groove 2b and the cam follower 7i enters the cam groove 2c. Meanwhile the cam follower 4i is kept in the cam groove 2a and then, entering the cam groove of each cam follower into the cam ring 2 is finished.

After that, the guide protrusion 7f of the third group frame 7 is fit into an advancement guide groove 3a provided in the front key 3 and then, the third group frame 7 is kept capable of being advanced or retracted while its rotation is restricted by the front key 3. Consequently, the assembly of the lens barrel 1 of this embodiment is finished.

When the lens barrel 1 is in the collapsed condition, the cam ring 2 is rotated to the collapsed position θC shown in FIG. 9 and further, introduced to the collapsed position in the direction of the optical axis O.

Then, the cam ring 2 is introduced up to a photographing possible position along the optical axis O and the collapsed region A1 (see FIG. 9) is rotated counterclockwise to the wide end position θW through the zoom driving portion. By this rotation, the respective cam followers 4i, 6i, 7i are advanced or retracted relatively by the cam grooves 2a, 2b, 2c. The first group frame 4 and the focus holding frame 6 and the third group frame 7 are moved to the zoom wide end position enabling photographing along the optical axis O.

If the cam ring 2 is zoom driven throughout the zoom region A2 (see FIG. 9) up to the tele end position θT by the aforementioned zoom driving portion, the respective cam followers 4i, 6i, 7i are advanced or retracted relatively by the cam grooves 2a, 2b, 2c. Consequently, the first group frame 4, the focus holding frame 6 and third group frame 7 are moved from the zoom wide end position to the zoom tele end position along the optical axis O.

The focusing drive of the lens barrel 1 is carried out by advancing or retracting the focus frame 5 relative to the zoom-driven focus holding frame 6 along the optical axis O by means of a focus driving portion (not shown).

In the lens barrel 1 of the embodiment described above, the cam follower introducing groove 2d and the joint groove 2e are provided so as to be connected to the end portions of the cam grooves 2a, 2b, 2b in which the respective cam followers 4i, 6i, 7i of the first group frame 4, the focus holding frame 6 and third group frame. When inserting the cam follower into the cam groove, this is done through the cam follower introducing groove 2d. However, only the cam follower 4i is inserted into the cam groove 2a through the cam groove 2b and then the joint groove 2e. By employing such cam follower inserting structure, the intersecting portion between the cam follower sliding portion in the cam groove and the cam follower introducing groove, provided in the conventional lens barrel is eliminated, thereby securing a smooth sliding of the cam follower. Further, because the aforementioned cam groove intersecting portion is not provided, restriction on setting of the phase among the cam grooves 2a, 2b, 2c at a cam ring rotation position is decreased, so that restriction on design of the cam ring 2 is also decreased. Therefore, it is possible to provide a lens barrel apparatus ensuring an excellent space efficiency and achieving reduction of the size and compactness.

In the lens barrel 1 of this embodiment, the guide shafts 8, 9 are fixed to the focus holding frame 6 located substantially in the center, so that both ends of each of the guide shafts 8, 9 are slidable relative to the first group frame 4 and the third group frame 3. Therefore, as compared to a conventional cantilever structure in which an end of the guide shaft is supported by the lens barrel, the span of the shaft is shortened so that the bending is decreased. Consequently, the frame members can be advanced or retracted more accurately. Further, the diameter of the guide shaft can be also reduced thereby contributing to reduction of the size of the lens barrel.

The guide shaft 11 supports the focus frame 5, whose rotation around the guide shaft 11 is restricted by the boss portion 4c of the first group frame 3, slidably through the sleeve 10. As shown in FIG. 8, an end of the guide shaft 11 is supported by the shaft hole 4f of the first group frame 4 and the other end thereof is supported slidably by the shaft hole 7c in the third group frame 7. Because the fitting lengths of the shaft holes 4f, 7c are short and an inclination of the guide shaft 11 has a freedom so that it is capable of being unparallel to the guide shafts 8, 9, a disparity and error of dimension of the first group frame 4 or third group frame 7 can be absorbed.

Further, if the diameter of the guide shaft 11 is small, a high load torque is applied between the focus frame 5 and the focus holding frame 6 when the focusing is driven. At this time, if the guide shaft 11 is about to be bent largely, the focus frame 5 is prevented from being deviated largely, because the fitting outer circumferential portion 5f of the focus frame and the fitting outer circumferential portion 6e of the focus holding frame are fit to each other slidably.

As described above, according to the present invention, as a cam follower inserting structure for inserting a cam follower for advancing or retracting each lens holding frame into a cam in the cam ring, a structure for inserting the cam follower through the cam follower introducing groove and the joint groove, joined to the end of the cam follower, is employed. Therefore, the cam groove intersecting portion between the cam follower sliding portion in the cam groove and the cam follower introducing groove, provided in the conventional lens barrel, becomes unnecessary, so that a smooth sliding of the cam follower can be achieved and the assembly is facilitated. Further, restriction on design of the cam is decreased and it is possible to provide a zoom lens barrel ensuring an excellent space efficiency and achieving reduction of the size and compactness.

What is claimed is:

1. A zoom lens barrel comprising:
   a first lens and a second lens having a common optical axis;
   a first lens holding frame, holding said first lens, movable in a direction of the optical axis, and having a first cam follower;
   a second lens holding frame, holding said second lens, movable in the direction of the optical axis, and having a second cam follower; and
   a cam ring having first and second cams maintaining a sliding contact with said first and second cam followers so as to control movement of said first and second lens holding frames in the direction of the optical axis, wherein an end of said second cam includes an opening portion provided in said cam ring in which said first and second cam followers are introduced and an end of said first cam is joined to an other end of said second cam as if said first cam is returned therefrom while said first cam and said second cam are formed to extend side by side.

2. A zoom lens barrel as claimed in claim 1 further comprising:
   a joint portion for joining said first and second cams, wherein said second cam, said joint portion and said first cam are formed in this order.

3. A zoom lens barrel as claimed in claim 2 wherein said joint portion is formed in the direction of the optical axis.

4. A zoom lens barrel as claimed in claim 2 wherein said opening portion of said cam ring has an introducing portion for joining a cam ring end face to an end portion of the cam while said introducing portion, said second cam, said joint portion and said first cam are formed in said cam ring in this order.

5. A zoom lens barrel as claimed in claim 4 wherein said introducing portion is formed in the direction of the optical axis.

6. A zoom lens barrel as claimed in claim 1 wherein said cam ring contains at least two couples each comprising a continuous cam including said first and second cams, while an area formed between said first and second cams which are a couple of said at least two couples contains a part of another couple cam of said at least two couples.

7. A zoom lens barrel as claimed in claim 6 wherein a joint portion is included between said first and second cams.

8. A zoom lens barrel as claimed in claim 1 wherein said first and second cams have cam portions for zoom and collapsing respectively.

9. A zoom lens barrel as claimed in claim 8 further comprising:
a joint portion for joining the cams for collapsing of said first and second cams while said second cam, said joint portion and said first cam are formed in this order.

10. A zoom lens barrel as claimed in claim 4 wherein said joint portion and said introducing portion are formed in the direction of the optical axis.

11. A zoom lens barrel comprising:
a first lens and a second lens having a common optical axis;
a first lens holding frame, holding said first lens, movable in a direction of the optical axis, and having a first cam follower;
a second lens holding frame, holding said second lens, movable in the direction of the optical axis, and having a second cam follower;
a guide member having said first and second lens holding frames for guiding said first and second lens holding frames in the direction of the optical axis; and
a cam ring having first and second cam groves for maintaining a sliding contact with said first and second cam followers so as to control movement of said lens holding frames in the direction of the optical axis in cooperation with said guide member, wherein an end of said second cam groove includes an opening portion provided in said cam ring in which first and second cam followers are introduced and an end of said first cam groove is joined to an other end of said second cam groove as if said first cam is returned from the other end of said second cam while said first cam and said second cam are formed to extend side by side.

12. A zoom lens barrel as claimed in claim 11 further comprising:
a joint portion for joining said first and second cams, wherein said second cam, said joint portion and said first cam are formed in this order.

13. A zoom lens barrel as claimed in claim 12 wherein said joint portion is formed in the direction of the optical axis.

14. A zoom lens barrel as claimed in claim 12 wherein said opening portion of said cam ring has an introducing portion for joining a cam ring end face to an end portion of the cam while said introducing portion, said second cam, said joint portion and said first cam are formed in said cam ring in this order.

15. A zoom lens barrel as claimed in claim 14 wherein said introducing portion is formed in the direction of the optical axis.

16. A zoom lens barrel as claimed in claim 14 wherein said joint portion and said introducing portion are formed in the direction of the optical axis.

17. A zoom lens barrel as claimed in claim 11 wherein said cam ring contains at least two couples each comprising a continuous cam having said first and second cams, while an area formed between said first and second cams which are a couple of the two couples contains a part of the other couple cam.

18. A zoom lens barrel as claimed in claim 17 wherein a joint portion between said first and second cams of said couple of the continuous cam exists in said area.

19. A zoom lens barrel as claimed in claim 11 wherein said first and second cams have cam portions for zoom and collapsing respectively.

20. A zoom lens barrel as claimed in claim 19 further comprising:
a joint portion for joining the cams for collapsing of said first and second cams while said second cam, said joint portion and said first cam are formed in this order.

* * * * *